July 11, 1939.  J. F. WERDER  2,165,826
OIL FILTER
Filed April 21, 1937

John F. Werder INVENTOR.

Patented July 11, 1939

2,165,826

UNITED STATES PATENT OFFICE 2,165,826

OIL FILTER

John F. Werder, Lakewood, Ohio

Application April 21, 1937, Serial No. 138,219

4 Claims. (Cl. 210—165)

This invention relates to oil filters of the replaceable type such as are now used on automobiles, trucks, buses, aeroplanes, etc.

One of the objects of the present invention is to provide a filter which can be easily and quickly changed when the filtering element therein becomes clogged or full of foreign matter, such change to be made without disconnecting any tubes or clamps.

A still further object is to make a filter which is burst proof and, at the same time, very inexpensive and easily assembled.

Still further objects will appear from the following description and claims when considered with the accompanying drawing.

Most filters now in use on motor vehicles are attached to the dashboard or the motor itself with the removable clamp. Inlet and outlet tubes then carry the oil from the motor through the filter and return it to the crankcase. After a few thousand miles running all filters become clogged with foreign matter so that they are of little if any value thereafter. With the type filter mentioned above it is necessary to disconnect the inlet and outlet tubes, then loosen the bracket and take out the old filter. A new filter is then put in place, the clamp tightened, and the inlet and outlet tubes again connected. All of this requires considerable time and often difficulties are encountered in attaching the inlet and outlet connections and a leak may develop. However, with proper fittings and sufficient time a satisfactory connection can be made.

There are also filters of the replaceable cartridge type now on the market in which the inlet and outlet connections are not disturbed but a large cover on top of the filter is removed, the old cartridge pulled out and the new one installed. The cover is then drawn up tightly with one or more screws against a gasket. The opening on this type of filter is necessarily large and difficulties have been encountered with oil leaking out around the gasket. Any such leakage is, of course, very serious because the pressures on the oiling system of modern engines is relatively high and it does not take long for even a small leak to completely drain the crankcase and ruin the motor.

In removing the filters or changing the cartridge on either of the above the job should be done by a skilled mechanic although I am aware that some car owners make these changes themselves.

In my filter the change is accomplished simply by unscrewing the old filter and screwing a new one on in its place. Anyone who can change a spark plug can change my filter in a few seconds time.

Figure 1:
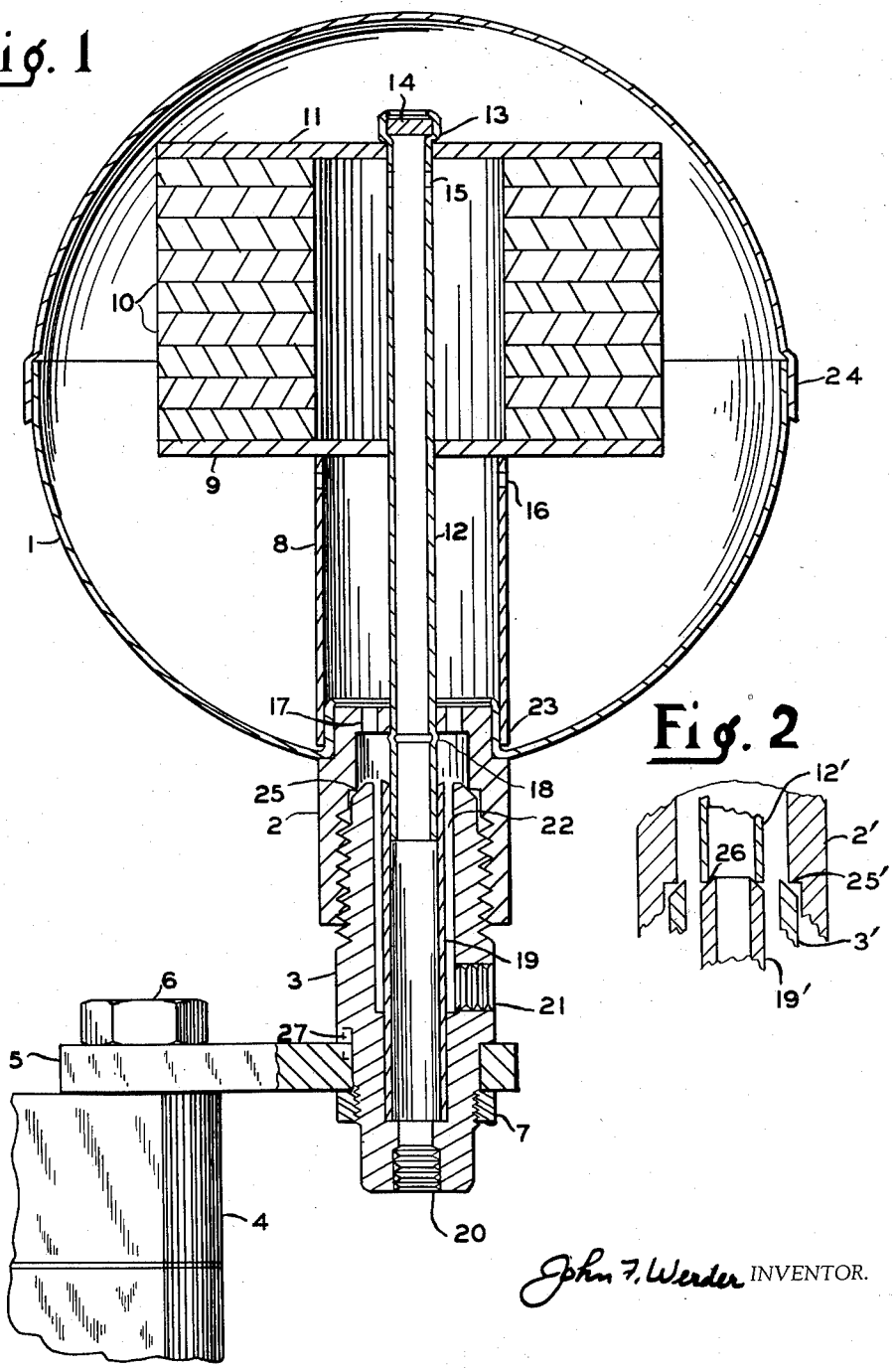
Fig. 1 is a diagrammatic view of my device attached to its bracket mounted on the motor block.

In Fig. 1 numeral 1 is a two piece spherical shell or case, the lower end of which terminates in the screw connection 2. This connection screws on to the motor fixture 3 which is permanently attached to the motor block 4 through the bracket 5 and the cap screw 6. Numeral 7 represents the nut which holds the motor fixture on the bracket.

8 is a spacer tube which supports steel washer 9. 10 represents filtering medium which, for example, can be felt washers. Numeral 11 is another steel washer which is held in place by tube 12 which is flared out at 13 over the plug 14. 15 is a passage hole through tube 12 and 16 is a similar passage through tube 8. 17 is a hole through the end wall of screw connection 2, and 18 is a flared portion on tube 12 to hold the whole internal assembly together. 19 is a tube pressed into motor fixture 3 establishing connection with threaded opening 20. Threaded opening 21 establishes connection with the annular space 22 between tube 19 and inside portion of body 3. 27 is a key to securely hold motor fixture 3 from turning in bracket 5. 24 is the seam where the two halves of filter shell are pressed together. 25 is a sharp edge seat on body 2 which makes an oil tight fit against beveled end of fixture 3.

Figure 2:
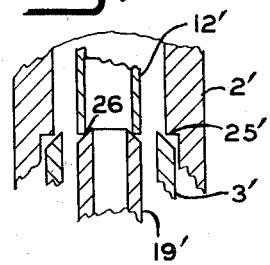
Fig. 2 is a diagrammatic view of a modified type of construction of the connecting joint itself.

In Fig. 2 similar numbers indicate similar parts in Fig. 1. 26 shows the sharp angle seat principle applied to the return flow line as well as the intake.

In operation oil enters through 21, flows up through passage 22 and holes 17 into support tube 8. From there it flows through hole 16 and then through filter medium 10 and through holes 15 and down through inside of tube 12 and on out through tube 19 and threaded opening 20. To change filters it is only necessary to unscrew the filter at screw connection 2 and put on a new one in its place. The sharp angle joint at 25 assures an oil tight connection which prevents leakage. It will be noted that tube 12 merely slips into tube 19. This, I realize, does not establish an absolutely tight connection but is sufficiently tight for all practical purposes. If for any reason an absolutely tight connection is desired on both inlet and outlet flows I use the sharp angle seat on tubes 12' and 19' as shown in Fig. 2. In this case I make 19' long enough so that contact is first established between the bevel portion of tube 19' and the sharp edge of tube 12'. The area of this joint 26 is relatively small and will stand considerable compression or deformation to permit the bevel portion of motor fixture 3' to still establish a tight joint to screw connection 2' and 25'. It is understood, of course, that contact could occur on 26 and 25' simultaneously only this would require closer fits and workmanship throughout.

It will be noted that the filter shell 1 is of substantially spherical shape with a lap joint at 24. This is an extremely inexpensive type of construction and the two halves can easily be soldered together. On a shell, for example, 4" in diameter made out of light material and the joint only soldered a pressure of over five hundred pounds will not cause a rupture or leak. This pressure is, of course, much higher than called for on usual installations but it illustrates the strength of my inexpensive type of construction.

It will be noted that holes 16 are placed at the top end of supporting tube 8. This leaves a sump at the bottom of shell 1 in which water and dirt can accumulate and settle. Additional oil flowing through holes 16 will not tend to disturb any such settlements as may be accumulated.

It is obvious that the invention is not limited to the specific forms as illustrated but that it may be modified further within the scope of the appended claims.

I claim:

1. In a filter, a casing with one opening, secured in said opening an internally threaded member with a seat formed by a counterbore extending beyond the threaded portion and of smaller diameter than said threaded portion, a wall at the end of said counterbore, a central hole thru the end of said wall and an off center hole thru said wall between said counterbore and said central hole; a tube passing thru said central hole and attached thereto and extending inside said casing, filtering means surrounding said tube inside of said casing so that fluid entering said casing thru said off center hole will pass thru said filtering means and come out thru said tube.

2. In a filter, a casing with one opening, secured in said opening an internally threaded member with a seat formed by a counterbore extending beyond the threaded portion and of smaller diameter than said threaded portion, a wall at the end of said counterbore, a central hole thru the end of said wall and an off center hole thru said wall between said counterbore and said central hole; a tube passing thru said central hole and extending inside said casing and attached thereto, filtering means surrounding said tube inside of said casing so that fluid entering said casing thru said off center hole will pass thru said filtering means and come out thru said tube, a mounting bracket consisting of a block threaded on one end and a tapered seat on said threaded end of a diameter smaller than said threaded portion, said threads and seat cooperating with said internally threaded member and seat secured in said opening to establish a tight seal, a large bore running partially thru said block, and a smaller bore continuing thru the balance of said block, both of these bores being on a projected axis of said seat and threads, a second tubular member mounted in said smaller bore and cooperating with said tube in said casing to establish a sliding connection therewith and also forming a separate channel between itself and said large bore in said bracket, and both tubes continuing said channel to communicate with said off center hole in said internally threaded member secured in said opening, a side opening entering into said channel from the outside of said block, means for attaching inlet and outlet pipes to said side opening and smaller bore thru end of said block.

3. In a filter, two semi-spherical halves permanently joined together to form a complete sphere, a single opening in said sphere, an internally threaded thimble mounted in said opening, a circular seat within said thimble adjacent to the threads, a central opening thru the closed end of said thimble, a tube mounted in said central opening and extending into said sphere, a second opening in said closed end of said thimble located between said central opening and said seat and forming a channel communicating with the inside of said sphere, filtering means located about said tube within said sphere so that fluid passing thru said second opening will flow thru said filtering means and come out thru said tube.

4. In a filter, two semi-spherical halves permanently joined together to form a complete sphere, a single opening in said sphere, an internally threaded thimble mounted in said opening, a circular seat within said thimble adjacent to the threads, a central opening thru the closed end of said thimble, a tube mounted in said central opening and extending into said sphere, a second opening in said closed end of said thimble located between said central opening and said seat and forming a channel communicating with the inside of said sphere, filtering means located about said tube so that fluid passing thru said second opening will flow thru said filtering means and come out thru said tube, an externally threaded fitting, a circular seat adjacent to the threads, said seat and threads cooperating with said seat and threads in above mentioned thimble to establish a tight seal, a large opening in said externally threaded fitting on the same axis as said seat and threads and extending beyond said threads, a smaller opening at the end of said large opening running clear thru said fitting and on a projected axis of the large opening, a second tube secured in said smaller opening and extending thru said large opening and forming a channel between said tube and said large opening and cooperating with said tube in said thimble to establish a sliding connection therewith, a side opening entering into said channel from the outside of said fitting, means for connecting inlet and outlet pipes to openings in said fitting.

JOHN F. WERDER.